United States Patent [19]

Aulich et al.

[11] 4,173,459
[45] Nov. 6, 1979

[54] METHOD FOR PRODUCING A LIGHT CONDUCTING FIBER

[75] Inventors: Hubert Aulich, Munich; Josef Grabmeier, Kempfenhausen; Hans Pink, Starnberg, all of Fed. Rep. of Germany

[73] Assignee: Siemens Aktiengesellschaft, Berlin & Munich, Fed. Rep. of Germany

[21] Appl. No.: 828,150

[22] Filed: Aug. 26, 1977

[30] Foreign Application Priority Data

Aug. 30, 1976 [DE] Fed. Rep. of Germany ....... 2638991

[51] Int. Cl.² ............................................. C03B 37/02
[52] U.S. Cl. ......................................... 65/3 A; 65/13; 65/60 D; 65/DIG. 7
[58] Field of Search ................. 65/1, 2, 3 A, 13, 60 D

[56] References Cited

U.S. PATENT DOCUMENTS

| | | | |
|---|---|---|---|
| 3,932,162 | 1/1976 | Blankenship | 65/3 A |
| 4,061,484 | 12/1977 | Aulich et al. | 65/3 A X |
| 4,065,280 | 12/1977 | Kao et al. | 65/3 A |

FOREIGN PATENT DOCUMENTS

| | | | |
|---|---|---|---|
| 2447353 | 4/1976 | Fed. Rep. of Germany | 65/3 A |
| 2637937 | 3/1978 | Fed. Rep. of Germany | 65/3 A |
| 2645375 | 4/1978 | Fed. Rep. of Germany | 65/3 A |

*Primary Examiner*—Robert L. Lindsay, Jr.
*Attorney, Agent, or Firm*—Hill, Van Santen, Steadman, Chiara & Simpson

[57] ABSTRACT

A method of producing a light conducting fiber by providing a rotating, heatable crucible having a cylindrical interior wall, successively depositing optical material forming layers from a liquid phase with the first layer being deposited on the interior wall of the rotating crucible and subsequent layers being deposited on a previous deposited layers, transforming each layer into a film of optical material to form a workpiece having a plurality of concentric cylindrical films of optical materials, and subsequently pulling the fiber from the workpiece while it is still in the crucible.

5 Claims, 1 Drawing Figure

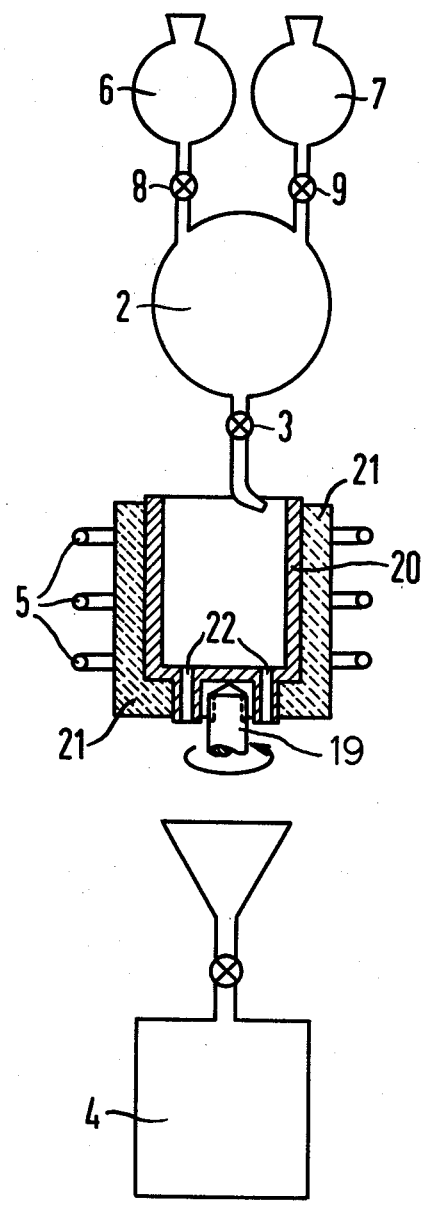

METHOD FOR PRODUCING A LIGHT CONDUCTING FIBER

BACKGROUND OF THE INVENTION

1. Field of the Invention

The present invention is directed to a method of producing light conducting fibers and particularly to a method of producing a workpiece which is composed of concentric cylindrical films and is subsequently pulled into the optical fiber.

2. Prior Art

Thin glass fibers are utilized as transmission medium in optical communication transmission systems. The glass fibers generally consist of a fiber core and cladding composed of materials which have been selected so that the refractive index of the core is higher than the refractive index of the material forming the cladding.

A cladded light conducting fiber with a stepped index profile and a cladded light conducting fiber with a gradient index profile are known. A stepped index profile means that the refractive index abruptly changes its value at the boundary surface of the core and cladding so that the core has a higher refractive index than the cladding. A gradient index profile means that the light conducting fiber has a higher refractive index in the vicinity of the fiber axis and that this refractive index continuously decreases with an increasing distance from the fiber axis. Both types of fibers can have an additional synthetic material casing which is to protect the fiber particularly from mechanical damages. In each type of light conducting fibers, light can be guided or conveyed over very long distances.

The technique of chemical vapor deposition is known for the production of such fibers, for example see the publication by J. B. Mac Chesney, P. B. O'Connor, F. V. DiMarcello, J. R. Simpson, P. D. Lazey "Preparation of Low Loss Optical Fibers Using Simultaneous Vapor Phase Deposition and Fusion", *10th International Congress of Glass*, (1974), pages 6–40 to 6–45. To form an optical fiber having a stepped index profile, a double crucible method has been suggested (see H. G. Unger, "Optical Communications Technique", 1976, Berlin, pages 38–40).

In copending U.S. patent application, Ser. No. 782,951 which issued as U.S. Pat. No. 4,061,484 granted 12-6-77 (based on German application No. P 26 14 631), a method for producing light conducting fibers is described and the disclosure of the application is incorporated into the present application by reference thereto. The method utilizes a rotating heated crucible in which glass masses were placed one at a time successively so that a workpiece composed of concentric cylindrical glass layers or films was formed. Due to the rotational movement of the crucible, the glass mass which was first inserted into the crucible would be pressed on the cylindrical wall of the crucible and later inserted glass masses would be formed on the precedingly formed layer or film. Thus, the outermost glass layer of a workpiece is formed by the first glass mass, which was inserted into the crucible, and the innermost glass layer of the workpiece is formed by the last glass mass which was inserted into the crucible. If the various glass masses had different indices of refraction, then the glass layers formed from these masses would posses different indices of refraction. The workpiece, which was formed in this manner, can then be directly stretched into a glass fiber from the rotating crucible.

Since in the above method, the index of refraction of each layer or film of the workpiece will depend on the index of refraction of the mass utilized to form the layer, light conducting or optical fibers having different type profiles for the index of refraction can be formed. The method can be used to form fibers having a step index profile or a fiber having a gradient index profile.

SUMMARY OF THE INVENTION

The present invention is directed to a method of producing a light conducting fiber with a radially changing index of refraction which may have either a stepped profile or a gradient profile and which method is inexpensive and can be easily accomplished. The present invention is directed to a method comprising providing a rotating, heatable crucible having a cylindrical interior wall, successively depositing optical material forming layers from a liquid phase with the first layer being deposited on the interior wall of the rotating crucible and the subsequent layers being deposited on the previously deposited layers, transforming each layer into a film of optical material to firm a workpiece having a plurality of concentric, cylindrical films of optical material; and subsequently pulling a fiber from said workpiece.

Advantageously, the optical fibers produced by the present invention can be produced with glass film or layers which are particularly pure so that light conductive fibers with exceedingly low attenuation can be stretched or drawn from the workpiece. These fibers are particularly advantageously useful for transmissions of optical signals over long distances in an optical communication system.

In the present invention, an optical material is meant to include glass-like synthetic materials as well as glass. When the optical material is glass, the glass forming layers are deposited sequentially in the rotating crucible and these layers are then subsequently transformed into glass films by means of thermal decomposition of the layers. When a glass-like synthetic material is used as an optical material, low molecular weight polymers or monomers are dissolved in a solution medium and are brought to polymerization during vaporization of the solution medium, for example, by means of increasing the temperature, ultraviolet radiation or gamma radiation.

The preferred sample embodiment is described as follows. In one sample embodiment, a liquid phase consisting of water-free solution in which compounds of glass forming oxides of elements selected from a group consisting of Se, Te, P, As, Si, Ge, Sn, Pb, Ti, B, Al, Mg, Ca, Sr, Ba, Li, Na, K and Rb are contained. The glass forming layers are deposited from these solutions and the layers are then transformed into glass films by means of thermal decomposition.

In accordance with the glass composition desired, the solution to be utilized is to contain the desired amount of one of the above mentioned elements either as (a) pure compounds with low monocarboxylic or dicarboxylic acids, wherein the number of carbon atoms in these acids is not to be higher than four; (b) metal halides whose anions are partially substituted by the acid radical selected from a group consisting of monocarboxylic and dicarboxylic acids and additionally partially substituted by radicals selected from a group consisting of hydroxyl, and alcoholate radicals of lower alcohols which have less than four carbon atoms per molecule.

A solution medium for the production of the solutions, which contain the compounds under (a) through (c) as mentioned above, is selected from a group consisting of lower ketones, lower alcohols, esters of lower alcohols with lower carboxylic acids and combinations thereof. The term lower is understood to mean that not more than four carbon atoms are bonded in one molecule.

BRIEF DESCRIPTION OF THE DRAWING

The FIGURE schematically illustrates an apparatus for performing the method of the present invention.

DESCRIPTION OF THE PREFERRED EMBODIMENTS

The principles of the present invention are particularly useful for producing a light conducting fiber, which may be either of glass-like synthetic materials or glass materials and with either a step profile for the index of refraction or a gradient profile with a radically changing index of refraction.

In accordance with the method of the present invention, a rotating crucible 20 is provided. The crucible 20 can consist of either platinum or iridium and other materials are also possible; however, it is necessary that the materials of the crucible do not enter into any undesirable reaction with the optical materials which are disposed therein. The crucible can be heated inductively as for example by an induction heating coil 5. The crucible 20 is also sheathed with a heat insulation layer 21 and will rotate about an axis such as the axis of pin 19.

To form a layer on an interior wall of the crucible 20, a solution which is described hereinabove and is contained in a supply container 2, is guided through a valve 3 and a nozzle so that it is applied on the rotating interior wall of the crucible 20. A thin liquid film or layer will be formed by the rotation of the crucible on the total interior wall with the thickness of this layer being essentially determined by the rotational velocity of the crucible, the wettability of the material forming layer, and the viscosity of the solution.

The rotation of the crucible will cause the layer to have an even thickness. To ensure a coating or layer with an even thickness, it is desirable to feed a surplus of the solution in container 2 into the crucible 20. The extra solution or surplus is collected in a container 4 after it flows through holes such as 22 in the crucible base. The collected surplus in the container 4, if desired, can be re-used. As soon as a sufficiently thick glass forming layer is deposited on the interior wall of the crucible 20, the valve 3 is closed and the transformation, which may be by thermal decomposition, of the layer on the interior wall of the crucible proceeds so that a glass-like film is formed on the interior wall.

Prior to starting the step of thermal decomposition, the solvent of the layer should be removed. If the crucible has been placed in a vacuum chamber, the chamber will be temporarily evacuated in order to vaporize the solvent from the deposited layer. It is also possible to blow oxygen into the crucible 20 after closing the dosage valves 3 so that the solvent remaining in the layer is oxidized and removed therefrom.

Whether the solvent was removed by a flow of oxygen or by evacuation; after its removal, the layer is heated by means of the induction coils 5 so that the thermal decomposition can occur. The temperature produced by the induction coil 5 is selected in such a manner that glassy or vitreous blister-free glass films are formed on the interior wall of the crucible during the thermal decomposition of the layer. It is also desirable to maintain the rotation of the crucible during the thermal decomposition to guarantee that the glass forming layer retains its even thickness.

After producing the first layer, a second layer is then formed on the first layer by repeating the above described operations of depositing the glass-forming layer and then transforming the layer into the film.

The coating process described hereinabove can be repeated in multiple operating cycles so that the glass films of arbitraty thickness or multiple glass films composed of various individual glass films can be produced.

If glass films of multiple component glass are to be produced, individual containers such as 6 and 7 are provided (note only two containers are illustrated). Each of these containers will accommodate a solution for an individual glass component. These solutions are guided to the supply container 2 by dosage or control valves 8 and 9 and once emitted to the chamber 2 are thoroughly homogenized by stirring, if necessary. Subsequently, multiple components, which have been produced in the container 2, are fed into the crucible 20 as described hereinabove.

In the case of producing light conducting fibers with parabolic cores of refractive index, various glass forming layers are deposited in the crucible 1 in succession and then the layers are thermally decomposed into the glass films. For the formation of each layer, solutions of different compositions are produced in the supply container 2. Accordingly, different amounts of solutions for the individual components are fed into supply container 2 from the containers 6 and 7. It is therefore possible to automatically set the precise concentration of the various components in the solution in the supply container by using a program generator for controlling the actuation of the valves 8 and 9.

In one sample embodiment, the liquid phase for the layer or coating in the crucible 20 is produced as follows: 0.6 mol acetic acid is dissolved in 60 ml acetic ester. This mixture is placed in a round bottom flask which has a reflux cooler and 0.15 mol $SiCl_4$ is added to the solution. This mixture is heated to the boiling point for approximately 6 hours. After it is cooled, a white crystal compound is deposited from the mixture by using a dry flow of purified inert gas, for example argon or oxygen. After accomplishing the deposition of the white crystal compound, the remaining reaction solution is poured off.

The crystal compound is then dissolved in a mixture of 40 ml $C_2H_5OH$ and 60 ml $CH_3COOC_2H_5$. This solution can be additionally thinned or diluted for use, for example, with a mixture of $C_2H_5OH$ and $CH_3COOC_2H_5$, with pure $CH_3COOC_2H_5$, with pure $C_2H_5OH$ or with other lower alcohols or esters having not more than 4 carbon atoms per molecule.

This solution is now fed into a supply container 2 to be applied to the interior of the crucible 20. The layer deposited on the interior wall of the crucible from this solution after the thermal decomposition forms a highly purified clear $SiO_2$ film or layer. In order to obtain the desired index of refraction for the glass layers being formed, additional solutions can be mixed to this solution. For example, a solution, which contains lead in a compound which is soluble in a liquid phase and will be transformed into lead oxide (PbO) by thermal decomposition. If desired, the amount of this additional solution can be changed so that the index of refraction of each layer being applied to the interior wall of the crucible is changed so that a gradient profile is obtained.

These solutions with variable lead contents are now placed in the containers such as 6 and 7. By means of different mixing proportions of these solutions with the liquid phase in the supply container 2, a prescribed share of the lead oxide (PbO) can be obtained in each glass layer being produced.

Thus, by the above method, a workpiece having a shape of a hollow cylinder will be formed in the crucible with the workpiece consisting of a plurality of concentric cylindrical films or layers. Each of the concentric films or layers may have a different index of refraction depending upon the composition of the optical material forming layer. Thus, a workpiece can have a step profile or the workpiece can have a gradient profile with each layer having a slightly different index of refraction. Due to the temperature used during the thermal decomposition of the individual layers, and if the long heating times are utilized, it is possible to obtain a continuous curve for the radially changing index of refraction due to diffusion between adjacent layers at their boundary surfaces. Thus, gradual change, such as discussed in the above mentioned patent application, will occur instead of an abrupt or stepped change at each interface between adjacent glass films.

The pulling or drawing of a glass fiber from the workpiece can proceed in the following manner. The crucible 20 is placed in rotation and heated to a temperature at which the glass fiber can be stretched or pulled. Due to the rotation of the crucible, the individual concentric glass layers of the workpiece will not alter their position. A glass fiber can now be directly drawn or pulled out of the rotating crucible by means of a drawing mandrel.

A different possibility consists in turning the crucible 20 upside down. The workpiece which is still in the crucible, is heated in a narrow ring-shaped zone starting adjacent the edge of the crucible. After pulling or drawing temperature is attained, a fiber is then continuously drawn from the heated zone. With the aid of continuous motion of the heating zone along the axis of the crucible and workpiece, the total glass mass of the workpiece is consecutively brought to the desired drawing or pulling temperature so that it can be drawn into the fiber. A more detailed discussion of the apparatus for performing such a drawing step is disclosed in U.S. Pat. No. 4,061,484 whose disclosure has been incorporated by reference into the present application.

In processing the fiber after drawing, it is well known and expedient to provide the fiber with an additional synthetic material cladding or coating. This synthetic material cladding can be advantageously produced by means of depositing the synthetic material from a liquid phase as the glass fiber is pulled from the workpiece. For example the fiber is pulled through a bath containing the synthetic material such as a lower polymer or monomer in a solution medium, with the deposited polymers or monomers being then brought into polymerization by either utilizing a temperature increase, ultraviolet radiation or gamma radiation.

Although minor modifications might be suggested by those versed in the art, it should be understood that we wish to employ within the scope of the patent granted hereon all such modifications as reasonably and properly come within the scope of our contribution to the art.

We claim:

1. A method for producing a light conducting fiber, particularly a gradient glass-like fiber having a radially changing index of refraction, said method comprising providing a rotating, heatable crucible having a cylindrical interior wall; successively depositing glass forming layers from a liquid phase with the first layer being deposited on the interior wall of the rotating crucible and the subsequent layers being deposited on previously deposited layers, by providing a liquid phase consisting of a water-free solution having compounds of glass forming oxides of at least one element selected from a group consisting of Se, Te, P, As, Si, Ge, Sn, Pb, Ti, B, Al, Mg, Ca, Sr, Ba, Li, Na, K and Rb, and said solution having a solution medium selected from a group consisting of lower ketones, lower alcohols, esters of lower alcohols with lower carboxylic acid and combinations thereof; then thermally decomposing each layer into a glass film; to form a workpiece having a plurality of concentric, cylindrical glass films; and subsequently pulling a fiber from said workpiece.

2. A method according to claim 1, wherein the step of providing the liquid phase includes dissolving at least one of the elements of said group in an acid selected from a group consisting of monocarboxylic acid and dicarboxylic acid.

3. A method according to claim 1, wherein the element selected from the group of elements is in a compound of a metal halide and wherein an anion of the halide is partially substituted by a radical selected from a group of monocarboxylic acid and dicarboxylic acid radicals.

4. A method according to claim 3, which further includes that anions of the halides are additionally partially substituted by radicals selected from a group of hydroxyl radical, alcoholate radical of lower alcohols and combinations thereof.

5. A method according to claim 1 which further includes subsequently to the step of pulling a fiber from the workpiece, depositing a protective cladding of synthetic material from an additional liquid phase on the pulled fiber.

* * * * *